April 7, 1925.  1,532,233
A. O. DAHLBERG
MILK HEATING APPARATUS
Filed March 5, 1923
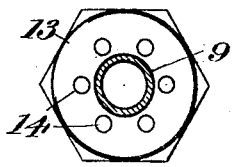
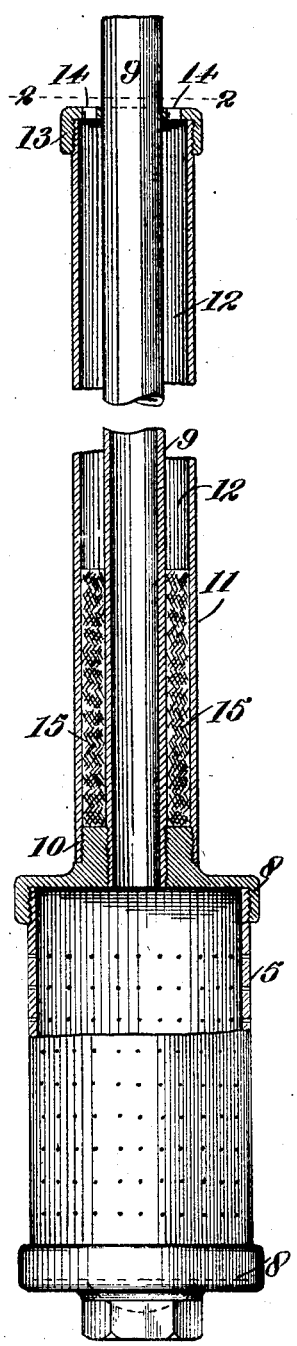
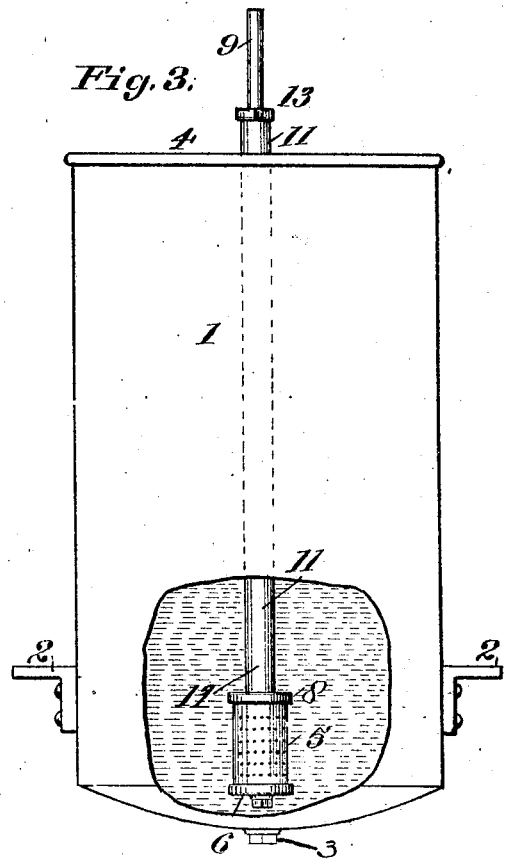
Inventor,
A. O. Dahlberg.
By Acker & Totten
Attorneys Patented Apr. 7, 1925.

1,532,233

UNITED STATES PATENT OFFICE.

ARNOLD O. DAHLBERG, OF SAN FRANCISCO, CALIFORNIA.

MILK-HEATING APPARATUS.

Application filed March 5, 1923. Serial No. 623,003.

*To all whom it may concern:*

Be it known that I, ARNOLD O. DAHLBERG, a citizen of the United States, residing at city and county of San Francisco and State of California, have invented certain new and useful Improvements in Milk-Heating Apparatus, of which the following is a specification.

In the manufacture of evaporated or condensed milk, the milk during its processing is fore-warmed in what is commonly termed a hot well and while therein is subjected to the action of live steam. The steam is supplied to the interior of the hot well by a pipe extending downwardly into the hot well from its top. Due to the extreme high temperature of the pipe caused by the passage of the steam therethrough and the lowering of the milk level in the hot well, the milk in contact with the pipe burns onto the pipe in the form of a brown crust which, due to the continued high temperature, peels from the pipe and drops into the hot well, mixing with the remainder of the milk and causing brown specks in the finished product. In addition to the deterioration of the finished product by the brown specks of burnt material therein, the cleaning off of the adhering of the burnt milk to the steam pipe is difficult and objectionable, it necessitating the scraping of the remainder of the burnt solids from the pipe which involves considerable labor and entails considerable expense.

My present invention relates to a construction of distributor head and steam feed pipe extending into the hot well whereby the burning of the milk onto the steam pipe is overcome and the consequent peeling of the brown crust and its deposit into the remainder of the contents of the hot well, is eliminated.

An object of this invention is to improve the apparatus for making any variety of condensed or evaporated milk for an improvement in the quality of the finished milk and a reduction in the time required for cleaning the apparatus.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings illustrating one embodiment of my invention, Fig. 1 is a view partly in vertical section illustrating the distributor head and the shielded steam pipe mounting the same.

Fig. 2 is a transverse sectional view on the line 2—2 of Fig. 1 and

Fig. 3 is a view of the embodiment of my invention in position within a hot well.

Referring to the several figures of the drawing wherein like characters of reference designate corresponding parts, 1 indicates a suitable tank or receptacle forming the hot well, the same being hung or supported preferably on brackets 2 and provided in its bottom with an outlet 3 normally connected with a vacuum pan but illustrated as being closed by a plug.

Depending downwardly from the open upper end 4 of the hot well 1 and held at a point adjacent the bottom of the hot well is a perforated steam distributor head 5 closed at its lower end by the member 6 and mounting on its upper end a coupling 8 threaded thereto and into which coupling is threaded the lower end of a steam supply pipe 9 adapted to extend upwardly from the open top 4 of the hot well 1. The pipe 9 is connected to any suitable steam supply source and not illustrated. The coupling 8 is exteriorly threaded as at 10 and to said thread 10 is threaded the lower end of a tube 11 of a diameter greater than the exterior diameter of the pipe 9 to afford between the inner wall of the tube and the outer wall of the pipe an annular space 12. The tube extends preferably to a point above the open top 4 of the hot well 1 as in Fig. 3 and at its upper end mounts a nut 13 surrounding the pipe 9 and which is perforated as at 14 in alignment with the annular space 12. The annular space 12 serves as an insulation between the outer surface of the steam pipe 9 and the contents 14 of the hot well 1 preventing the material as treated from contacting with the surface of the steam pipe and becoming burnt thereon. Practice has disclosed that the burning of the milk onto the steam pipe is greatest at its point of passage into the head. I overcome this by filling the space 12 between the pipes for a distance of approximately 4 inches from its lower end with asbestos or other insulating material 15 which prevents the transmission of heat from the lower end of the pipe to the tube 11. The hot air in the chamber 12 above the insulation 15 escapes through the orifices 14 in the nut 13, thus reducing the transmission of heat from the pipe 9 to the tube 11 to a minimum.

I claim:—

1. An apparatus for heating milk comprising in combination with a milk containing hot well, a perforated distributor head therein, a cap threaded thereto and forming a closure for one end thereof, said cap provided with a tubular nipple threaded interiorly and exteriorly, concentrically disposed tubular members threadably connected to said nipple with their walls in spaced relation and extending exteriorly of the hot well, the inner tube providing a steam conduit discharging into the distributor head, an insulating packing interposed between the tubes immediately above the cap, and a perforated nut slidably mounted on the inner tube and threadably connected to the upper end of the outer tube to afford a vent for the chamber between the tubes.

2. An apparatus for heating milk comprising in combination with a milk containing hot well, a perforated distributor head therein, a steam pipe depending into said hot well and connected at one end with said distributor head and at its other end with a source of steam supply, means surrounding said pipe for insulating the same from contact with the liquid within the hot well, and a nonporous covering overlying said insulator and extending to a point above the milk level in the hot well.

In testimony whereof I have signed my name to this specification.

ARNOLD O. DAHLBERG.